(12) United States Patent
Tawada

(10) Patent No.: US 10,448,178 B2
(45) Date of Patent: Oct. 15, 2019

(54) DISPLAY CONTROL APPARATUS, DISPLAY CONTROL METHOD, AND STORAGE MEDIUM

(71) Applicant: CANON KABUSHIKI KAISHA, Tokyo (JP)

(72) Inventor: Noriaki Tawada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 15/613,825

(22) Filed: Jun. 5, 2017

(65) Prior Publication Data
US 2018/0007481 A1   Jan. 4, 2018

(30) Foreign Application Priority Data

Jun. 30, 2016 (JP) .................................. 2016-130420

(51) Int. Cl.
| | |
|---|---|
| G06T 11/00 | (2006.01) |
| G06T 11/60 | (2006.01) |
| G06T 11/20 | (2006.01) |
| H04R 29/00 | (2006.01) |
| G10L 21/10 | (2013.01) |
| H04R 5/027 | (2006.01) |

(52) U.S. Cl.
CPC ............ *H04R 29/00* (2013.01); *G06T 11/001* (2013.01); *G06T 11/206* (2013.01); *G06T 11/60* (2013.01); *G10L 21/10* (2013.01); *H04R 29/008* (2013.01); *H04R 5/027* (2013.01); *H04S 2400/15* (2013.01)

(58) Field of Classification Search
CPC ..... G06T 11/206; G10L 21/10; H04R 29/008; H04R 5/027; H04S 2400/15
See application file for complete search history.

(56) References Cited

U.S. PATENT DOCUMENTS

| | | | |
|---|---|---|---|
| 7,920,102 B2* | 4/2011 | Breed .................... | B60K 35/00 340/991 |
| 9,661,435 B2* | 5/2017 | Skovenborg ......... | H04R 29/008 |
| 2015/0189457 A1* | 7/2015 | Donaldson .............. | H04S 7/303 381/1 |
| 2016/0148624 A1* | 5/2016 | Jonan ...................... | G10L 21/10 381/92 |
| 2018/0192186 A1* | 7/2018 | Tsingos ................. | G10L 19/008 |

FOREIGN PATENT DOCUMENTS

| | | |
|---|---|---|
| JP | 2014-127737 A | 7/2014 |
| JP | 2014-175996 A | 9/2014 |
| JP | 2015-198413 A | 11/2015 |

* cited by examiner

*Primary Examiner* — Peter Hoang
(74) *Attorney, Agent, or Firm* — Canon U.S.A., Inc. IP Division

(57) ABSTRACT

A display control apparatus includes an acquisition unit configured to acquire information about directivity of a sound collection unit that collects sound from a sound-collection target area, and a control unit configured to cause a display unit to display a display image in which an area image and a range image are superimposed on one another, the area image representing the sound-collection target area, and the range image having a shape expressing a sound collection range according to the directivity of the sound collection unit identified by the information acquired by the acquisition unit and representing loudness of sound in the sound collection range.

20 Claims, 9 Drawing Sheets

_(1)_

DISPLAY CONTROL APPARATUS, DISPLAY CONTROL METHOD, AND STORAGE MEDIUM

BACKGROUND

Field of Art

The present disclosure relates to a display control apparatus, a display control method, and a storage medium for displaying a sound collection state of a sound-collection target area.

Description of the Related Art

When sound is collected in a large-scale sound-collection target area such as a stadium, it is desirable to be able to grasp a sound collection state attributable to the directivity of each of a plurality of sound collection units arranged in the sound-collection target area.

Japanese Patent Application Laid-Open No. 2015-198413 discusses a related method. This method superimposes a representation of a specified range on a representation of a sound-collection target area, and controls the directivity of a sound collection unit, according to a change made to the specified range by an operation input of a user.

Japanese Patent Application Laid-Open No. 2014-127737 discusses a related method. This method superimposes the level of an acoustic signal indicating a collected sound of a channel, which corresponds to each division region of a video signal of a captured image, on the division region, in a bar-form level meter.

The method of Japanese Patent Application Laid-Open No. 2015-198413 cannot grasp a sound collection state attributable to the directivity of the sound collection unit, from the representation of the specified range superimposed on the representation of the sound-collection target area.

The method of Japanese Patent Application Laid-Open No. 2014-127737 can grasp the level of each of a plurality of acoustic signals indicating collected sounds, but cannot grasp a sound collection state attributable to the directivity formed by a sound collection unit.

SUMMARY

According to an aspect of a present embodiment, a display control apparatus includes an acquisition unit configured to acquire information about directivity of a sound collection unit that collects sound from a sound-collection target area, and a control unit configured to cause a display unit to display a display image in which an area image and a range image are superimposed on one another, the area image representing the sound-collection target area, and the range image having a shape expressing a sound collection range according to the directivity of the sound collection unit identified by the information acquired by the acquisition unit and representing loudness of sound in the sound collection range.

Features of the present invention will become apparent from the following description of exemplary embodiments with reference to the attached drawings.

DESCRIPTION OF THE EMBODIMENTS

An exemplary embodiment will be described in detail below with reference to the attached drawings. The exemplary embodiment described below is just an example, and may be corrected or modified as appropriate depending on a configuration and various conditions of an apparatus to which the present invention is applied. The present invention is not limited to the following exemplary embodiment. In addition, not all combinations of features described in the present exemplary embodiment are necessary to a solution of the present invention.

Figure 1:
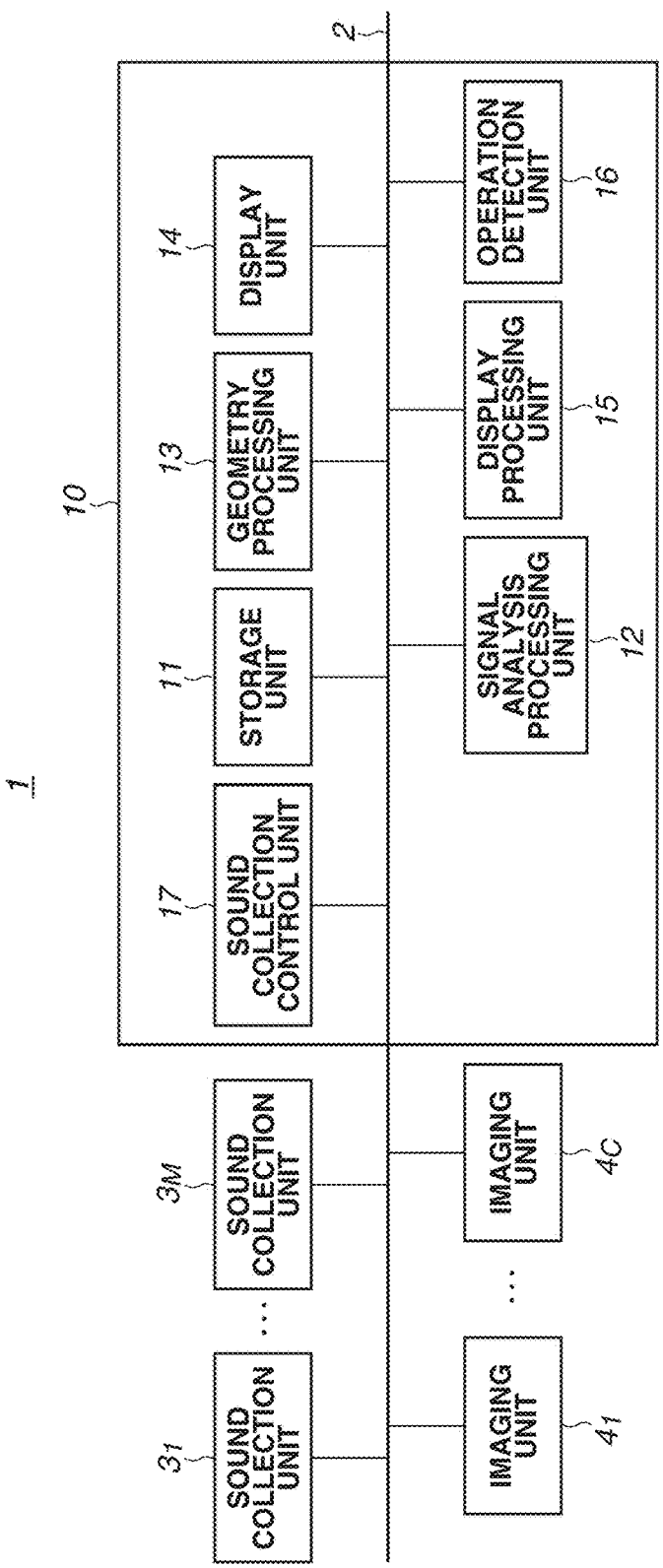
FIG. 1 is a block diagram illustrating a signal processing system according to an exemplary embodiment.

FIG. 1 is a block diagram illustrating a configuration of a signal processing system 1 according to an exemplary embodiment. The signal processing system 1 includes a control apparatus 10 that controls the entire system. The signal processing system 1 further includes an M number of sound collection units $3_1$ to $3_M$ and a C number of imaging units $4_1$ to $4_C$ that are arranged in a sound-collection target area. The control apparatus 10 and each of the sound collection units $3_1$ to $3_M$ as well as each of the imaging units $4_1$ to $4_C$ are connected with a network 2. The sound collection units $3_1$ to $3_M$ each include a directional microphone or a microphone array. The sound collection units $3_1$ to $3_M$ each also include an interface (I/F) for sound collection. The sound collection units $3_1$ to $3_M$ each supply an acoustic signal of sound being collected to the control apparatus 10 via the network 2. The microphone array may include, for example, a spherical microphone array in which a plurality of microphone elements is isotropically arranged in all directions. The imaging units $4_1$ to $4_C$ each include a camera, and an I/F for imaging. The imaging units $4_1$ to $4_C$ each supply a video signal of an image being captured to the control apparatus 10 via the network 2. Each of the sound collection units $3_1$ to $3_M$ are arranged to have a clear relationship with at least one of the imaging units $4_1$ to $4_C$ in terms of a position and an orientation.

Figure 2:
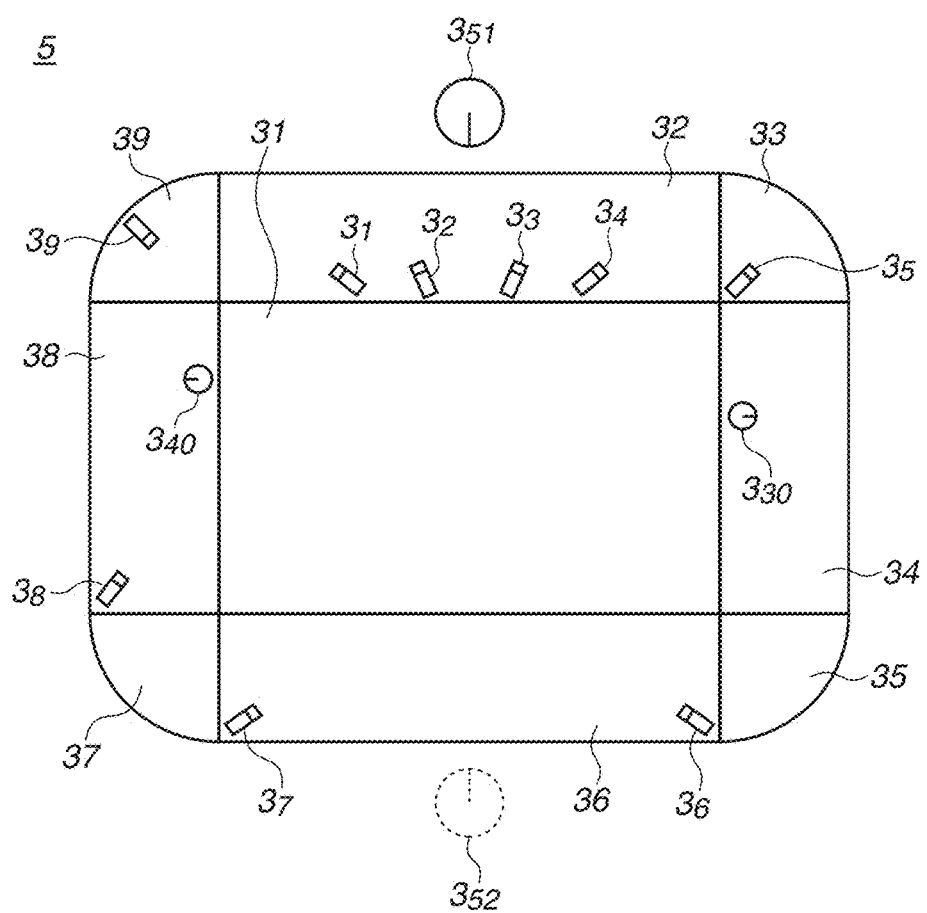
FIG. 2 is a diagram illustrating a sound-collection target area.

The sound collection units $3_1$ to $3_M$ each acquire sound from a sound-collection target area. The sound-collection target area is an area for which sound is collected by each of the sound collection units $3_1$ to $3_M$. In the present exemplary embodiment, the sound-collection target area is, for example, a sports stadium (a stadium) 5 having a ground area 31 and seat areas 32 to 39, as illustrated in FIG. 2. FIG. 2 illustrates a two-dimensional representation when a three-dimensional (3D) model of the stadium 5, which is the sound-collection target area, is viewed from right above.

For example, the sound collection units $3_1$ to $3_9$ are each configured as a directional microphone. Further, the sound collection units $3_{30}$ and $3_{40}$ as well as the sound collection units $3_{51}$ and $3_{52}$ are each configured as a microphone array.

The sound collection units $3_1$ to $3_4$ are arranged in the seat area 32, and acquire sounds of the seat area 32. The sound collection units $3_5$, $3_8$, and $3_9$ are arranged in the seat areas 33, 38, and 39, respectively, to acquire sounds of the seat areas 33, 38, and 39, respectively. The sound collection units $3_6$ and $3_7$ are arranged in the seat area 36 to acquire sounds of the seat area 36. In addition, the sound collection units $3_{30}$ and $3_{40}$ are arranged in the seat areas 34 and 38, respectively, to acquire sounds of the seat areas 34 and 38, respectively. The sound collection units $3_{51}$ and $3_{52}$ are arranged at positions away from the ground area 31 to acquire sounds of a predetermined region (division areas) within the ground area 31 remotely.

The control apparatus 10 includes a storage unit 11, a signal analysis processing unit 12, a geometry processing unit 13, a display unit 14, a display processing unit 15, an operation detection unit 16, and a sound collection control unit 17. The storage unit 11 stores various data.

The control apparatus 10 sequentially records acoustic signals supplied from the sound collection units $3_1$ to $3_M$, and video signals supplied from the imaging units $4_1$ to $4_C$, into the storage unit 11.

The storage unit 11 also stores data such as a 3D model of the sound-collection target area (the stadium), beam patterns of the directional microphone, filter coefficients of directivity formation, and a transfer function between a sound source in each direction and each of the microphone elements of the microphone array.

The signal analysis processing unit 12 performs analysis processing of an acoustic signal and a video signal. For example, the signal analysis processing unit 12 forms directivity of each of the sound collection units, by selecting a filter coefficient of directivity formation, and by multiplying an acoustic signal of sound being collected by the sound collection unit (the microphone array) by the selected filter coefficient. The geometry processing unit 13 performs processing for a position, an orientation, and a shape of the sound collection unit. The geometry processing unit 13 acquires information about the directivity of each of the plurality of sound collection units that acquire sounds of the sound-collection target area from the storage unit 11. The geometry processing unit 13 then detects a sound collection range on the sound-collection target area according to the directivity of each of the sound collection units identified by the acquired information. The display unit 14 is a display. In the present exemplary embodiment, the display unit 14 is configured as a touch panel. The display processing unit 15 generates a representation according to a sound collection state of the sound-collection target area, and displays the generated representation on the display unit 14. In other words, the display processing unit 15 superimposes a representation according to the directivity of the sound collection unit on a representation of the sound-collection target area, and causes the display unit 14 to display the superimposed representations. The representation according to the directivity of the sound collection unit includes the position, the directivity direction, and the sound collection range of the sound collection unit. Further, the display processing unit 15 superimposes a representation according to the sound collection range of the sound-collection target area attributable to the directivity of each of the sound collection units on the representation of the sound-collection target area, and displays the superimposed representations. The operation detection unit 16 detects a user operation input to the display unit 14 configured as the touch panel. The sound collection control unit 17 performs acquisition and adjustment of a sound-collection gain of the sound collection unit. The sound collection control unit 17 also performs mechanical control (such as changing the position and the orientation of the sound collection unit by remotely controlling a pan head, if, for example, the sound collection unit is configured as the directional microphone and includes components such as a pan head, which is remotely controllable) of the sound collection unit.

<Hardware Configuration>

Functional blocks of the control apparatus 10 in FIG. 1 are stored in a storage unit such as a read only memory (ROM) 22 illustrated in FIG. 3 to be described below, as a program to be executed by a central processing unit (CPU) 21. Some of the functional blocks illustrated in FIG. 1 may be implemented by hardware. Assume that one of the functional blocks is implemented by hardware. In this case, for example, a dedicated circuit may be automatically generated on a field programmable gate array (FPGA) from a program for implementing each step, by using a predetermined compiler. A gate array circuit may be formed as with the FPGA, to implement the functional block as hardware. Further, the functional block may be implemented by an application specific integrated circuit (ASIC).

Figure 3:
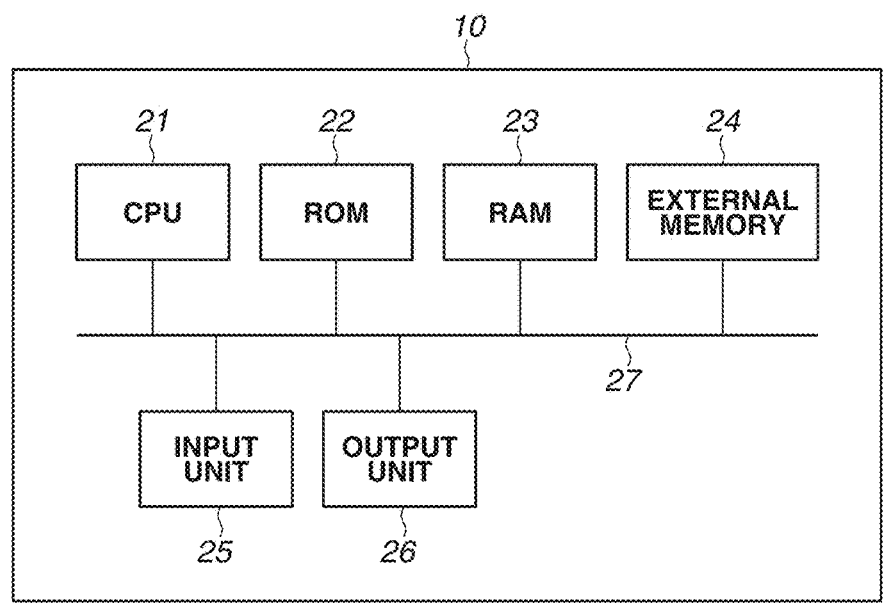
FIG. 3 is a block diagram illustrating a configuration of a computer according to the exemplary embodiment.

FIG. 3 illustrates an example of a hardware configuration of the control apparatus 10. The control apparatus 10 includes the CPU 21, the ROM 22, a random access memory (RAM) 23, an external memory 24, an input unit 25, and an output unit 26. The CPU 21 performs various kinds of computation and control for each part of the control apparatus 10 according to input signals and programs. Specifically, the CPU 21 performs detection of the sound collection range on the sound-collection target area attributable to the directivity of each of the plurality of sound collection units that acquire sounds of the sound-collection target area. The CPU 21 also performs generation of an image to be displayed by the display unit 14. The above-described functional blocks in FIG. 1 each represent a function to be executed by the CPU 21.

The RAM 23 is provided to store temporary data, and used for work of the CPU 21. The ROM 22 stores the program for executing each of the functional blocks illustrated in FIG. 1. The ROM 22 also stores various kinds of setting information. The external memory 24 is, for example, a detachable/attachable memory card. When the external memory 24 is attached to an apparatus such as a personal computer (PC), data can be read from the external memory 24.

Further, a predetermined region of the RAM 23 or the external memory 24 is used as the storage unit 11. The input unit 25 stores an acoustic signal supplied from each of the sound collection units $3_1$ to $3_M$ into a region used as the storage unit 11 in the RAM 23 or the external memory 24. The input unit 25 also stores a video signal supplied from each of the imaging units $4_1$ to $4_C$ into a region used as the storage unit 11 in the RAM 23 or the external memory 24. The output unit 26 causes the display unit 14 to display the image generated by the CPU 21.

<Details of Display Processing>

Figure 4:
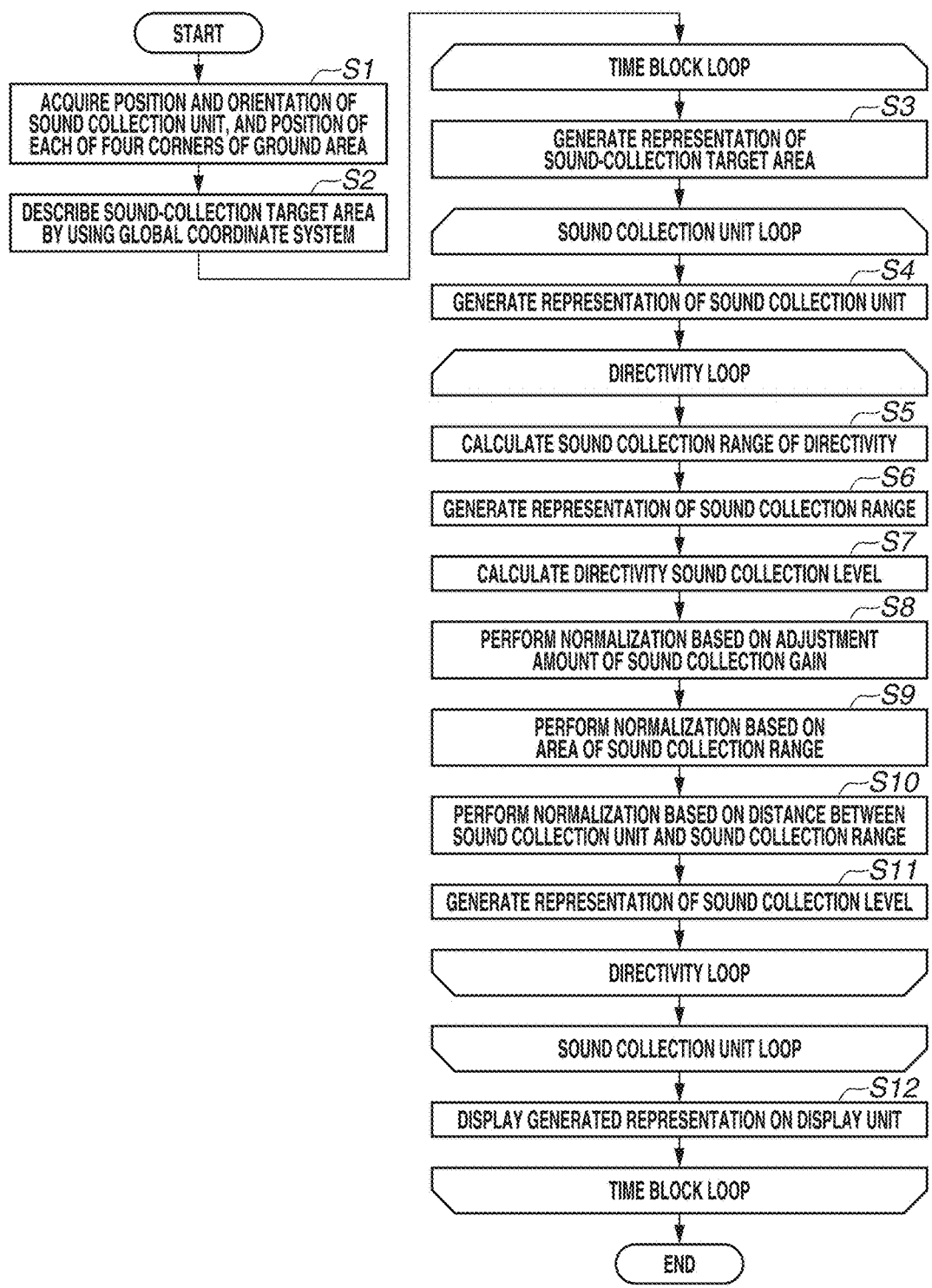
FIG. 4 is a flowchart illustrating display processing.

Details of display processing in the present exemplary embodiment will be described below with reference to a flowchart illustrated in FIG. 4.

In step S1, the following processing is performed. The geometry processing unit 13 and the signal analysis processing unit 12 calculate, in a coordinated manner, the position and the orientation of each of the imaging units $4_1$ to $4_C$. Further, the geometry processing unit 13 and the signal analysis processing unit 12 calculate, in a coordinated manner, the position and the orientation of each of the sound collection units $3_1$ to $3_M$ each having a clear relationship with any of the imaging units in terms of the position and the orientation. Here, the position and the orientation are described in a global coordinate system. For example, the center of the ground area 31 is taken as an origin of the global coordinate system, an x-axis and a y-axis are set to be parallel to each side of the ground area 31, and an upward direction perpendicular to the x-axis and the y-axis is set as a z-axis. The ground area 31 is thereby described as a ground area plane in which a range of x coordinates and y coordinates is limited by z=0.

The position and the orientation of each of the imaging units can be calculated by a known scheme called camera calibration. For example, markers for calibration may be arranged widely in the ground area, and imaged by the plurality of imaging units. The position and the orientation of each of these imaging units can be then calculated using a plurality of video signals obtained by the imaging. Once the position and the orientation of each of the imaging units $4_1$ to $4_C$ are determined, it is possible to calculate the position and the orientation of each of the sound collection units $3_1$ to $3_M$ each having a clear relationship with any of the imaging units in terms of the position and the orientation.

The method for calculating the position and the orientation of each of the sound collection units $3_1$ to $3_M$ is not limited to the method for performing calculation from the video signals. For example, a sound source for calibration may be disposed in the ground area 31, and the position and the orientation of each of the sound collection units $3_1$ to $3_M$ may be calculated from an acoustic signal of sound collected by each of the sound collection units. For example, a technique discussed in Japanese Patent Application Laid-Open No. 2014-175996 is applicable. Alternatively, the position and the orientation of each of the sound collection units $3_1$ to $3_M$ may be acquired by providing a global positioning system (GPS) receiver and an orientation sensor in each of the sound collection units.

The position of four corners of the ground area 31 in the global coordinate system can be obtained in this step S1 by placing a marker for calibration, a sound source, or a GPS receiver also at each of the four corners of the ground area 31, for example.

In step S2, the geometry processing unit 13 brings, for example, the four corners of the ground area 31 in the 3D model of the sound-collection target area (the stadium 5) held in the storage unit 11 into correspondences with the positions of the four corners of the ground area 31 acquired in step S1. This can associate the 3D model of the sound-collection target area with the global coordinate system. In other words, in step S2, the sound-collection target area is described with the global coordinate system. Here, the 3D model of the stadium, which is the sound-collection target area, includes not only information indicating the ground area 31 illustrated in FIG. 2, but also information indicating the seat areas 32 to 39. In view of this, not only the ground area plane on z=0 is described as the sound-collection target area, but also the seat areas 32 to 39 each having an inclination with respect to the ground area plane can be described as seat area planes in the global coordinate system.

In step S2, it may not be necessary to use the 3D model of the sound-collection target area. In other words, if a marker for calibration, a sound source, or a GPS receiver can be arranged also in each of the seat areas in step S1, description in the global coordinate system can be obtained in step S1 for both of the ground area plane and the seat area planes of the sound-collection target area. Then, the process in step S2 is unnecessary.

The control apparatus 10 executes processes in step S3 to step S12 for each time block having a predetermined duration, repeatedly in a time block loop. However, the control apparatus 10 may perform only the processes in step S7 to step S12 concerning a sound collection level for each time block, and perform other processes only in the initial time block.

Figure 5:
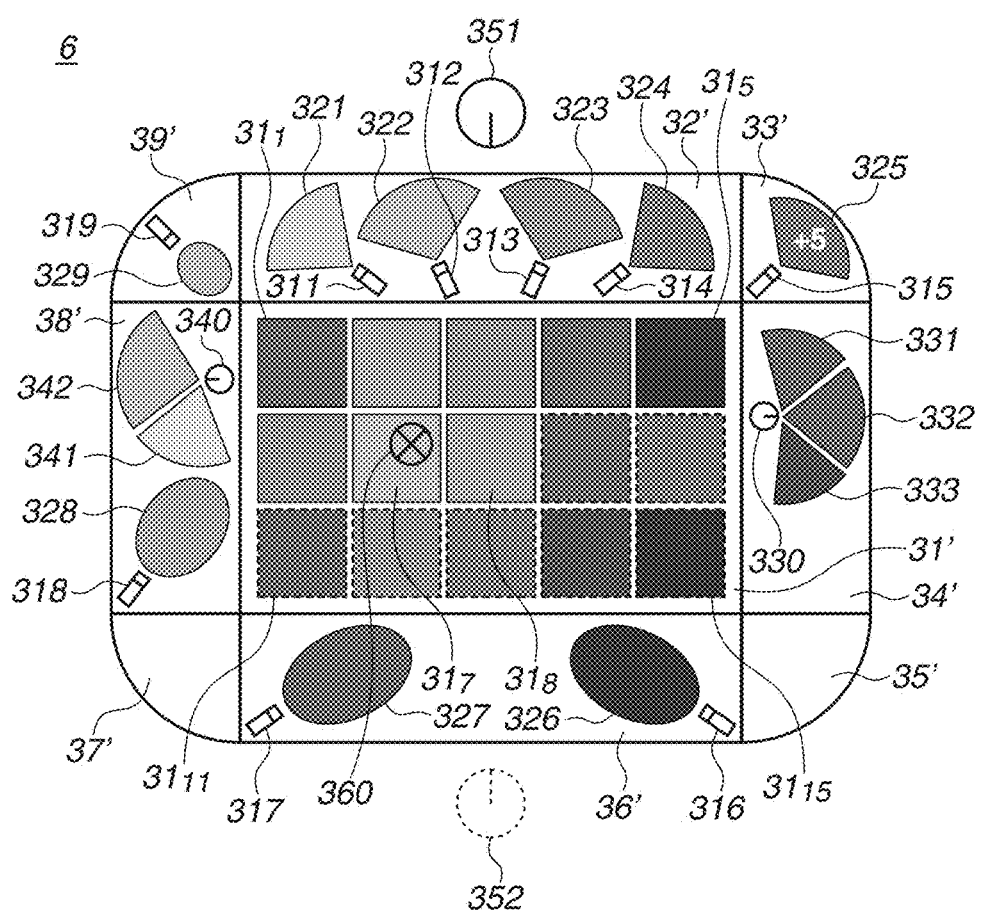
FIG. 5 is a diagram illustrating an example of a representation of a sound collection state.

In step S3, based on the 3D model of the sound-collection target area (the stadium 5) associated with the global coordinate system in step S2, the display processing unit 15 generates a schematic representation 6 of the ground area 31 and the seat areas 32 to 39 illustrated in FIG. 2 that form the sound-collection target area, as illustrated in FIG. 5. FIG. 5 illustrates a two-dimensional representation when the 3D model of the stadium 5 of the sound-collection target area is viewed from right above. In other words, the representation 6 is an area image of the sound-collection target area.

In this step S3, the display processing unit 15 first generates a representation 31' and representations 32' to 39' corresponding to the ground area 31 and the seat areas 32 to 39, respectively.

The processes in step S4 to step S11 are performed for each of the sound collection units, so that the control apparatus 10 repeats execution of the processes in step S4 to step S11 in a sound collection unit loop.

In step S4, the display processing unit 15 generates a representation in such a manner that the position and the orientation of each of the sound collection units $3_1$ to $3_M$ calculated in step S1 are clear. Further, the display processing unit 15 superimposes the generated representation on the representation of the sound-collection target area generated in step S3, and displays the superimposed representations. The representation of the position and the orientation of each of the sound collection units $3_1$ to $3_M$ is thereby displayed. In other words, the display processing unit 15 superimposes the representation (a sound collection unit image) according to the position and the directivity of each of the sound collection units on the representations 31' to 39' of the sound-collection target area, and displays the superimposed representations.

Figure 6:
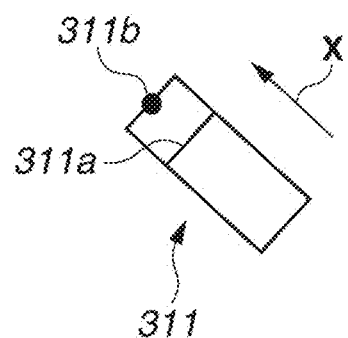
FIG. 6 is a diagram illustrating an example of a representation of a sound collection unit.

Specifically, when the sound collection unit is configured as the directional microphone, the display processing unit 15 displays, for example, a rectangle that schematically expresses the directional microphone, as the sound collection unit. This is exemplified by representations 311 to 319 of the sound collection units illustrated in FIG. 5. To be more specific, the display processing unit 15 displays a rectangle in which a midpoint (a midpoint 311b illustrated in FIG. 6) of a short side in a part provided with a pitch line (a line 311a illustrated in FIG. 6) corresponds to the position of the sound collection unit. Further, a direction from a part provided with no pitch line to the part provided with the pitch line (a direction indicated with an arrow X illustrated in FIG. 6) corresponds to the direction (an axial direction of the directional microphone) of the sound collection unit. Alternatively, in place of the midpoint 311b, an arbitrary point such as the center of the rectangle may correspond to the position of the sound collection unit. The long side of the rectangle may be longer as the directivity of the directional microphone is sharper. Alternatively, a trapezoid may be adopted instead of the rectangle, and an elevation angle of the sound collection unit may be expressed by the ratio between the bases of the trapezoid.

When the sound collection unit is configured as the microphone array, as exemplified by each of the sound collection units $3_{30}$, $3_{40}$, $3_{51}$, and $3_{52}$ illustrated in FIG. 2, the display processing unit 15 displays a circle (each of representations 330, 340, 351, and 352) that schematically expresses the microphone array, as the sound collection unit, as illustrated in FIG. 5. To be more specific, the display processing unit 15 displays a circle in which the center (or an edge with a radial line) of the circle corresponds to the position of the sound collection unit. In addition, a direction from the center of the circle to the edge with the radial line corresponds to the direction of the sound collection unit (a frontward direction of the microphone array). The radius of the circle may be longer, as the size of the microphone array is greater or the number of the microphone elements forming the microphone array is larger. For example, in the example illustrated in FIG. 5, the display processing unit 15 displays the circle as follows. The radius of the circle forming each of the representations 351 and 352 of the respective sound collection units $3_{51}$ and $3_{52}$ is greater than that of the circle forming each of the representations 330 and 340 of the respective sound collection units $3_{30}$ and $3_{40}$.

The method for schematically displaying the sound collection unit is not limited to those described above, and any kind of graphics and expressions capable of expressing a position and an orientation can be used. For example, an isosceles triangle may be used. In this case, a position of an apex of the isosceles triangle corresponds to the position of the sound collection unit, and a direction from a central point of a base to the apex corresponds to the direction of the sound collection unit.

When the sound collection unit is configured as the microphone array, not the directional microphone, a single sound collection unit (the microphone array) may form a plurality of directivities and thereby cover a plurality of sound collection ranges. Thus, the control apparatus 10 repeats execution of the processes in step S5 to step S11 concerning the directivity of each of the sound collection units, in a directivity loop.

In step S5, for the sound collection unit in the current sound collection unit loop, the signal analysis processing unit 12 acquires a beam pattern of directivity in the current directivity loop, and the geometry processing unit 13 calculates a sound collection range according to this beam pattern. In the present exemplary embodiment, the sound collection range attributable to the directivity of the sound collection unit is, for example, the range of the sound-collection target area for which sound collection is to be performed by the sound collection unit. The sound collection range attributable to the directivity of the sound collection unit is calculated as follows.

Figure 7:
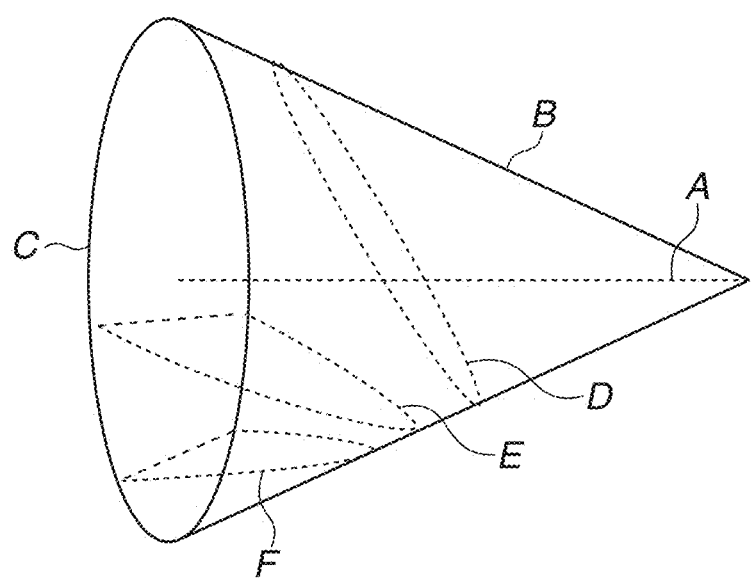
FIG. 7 is a diagram illustrating examples of a section of directivity.

The sound collection units $3_1$ to $3_9$ for collecting sounds of the seat areas 32 to 39 will be considered. When the sound collection unit is configured as the directional microphone, the signal analysis processing unit 12 acquires a beam pattern of the directional microphone held by the storage unit 11. There will be considered a collection of orientations in which an attenuation from the sound collection level of the directivity direction (the axial direction of the directional microphone [a directivity direction A in FIG. 7]) of the beam pattern is equal to a predetermined value (e.g., 3 dB). In this case, a cone in which these directions are each a generatrix direction (a generatrix B) is formed, as illustrated in FIG. 7. In the present exemplary embodiment, this is referred to as a directional cone, and the signal analysis processing unit 12 assumes that sound inside the directional cone is collected and sound outside the directional cone is suppressed. In other words, the geometry processing unit 13 determines a boundary of the sound collection range, based on an attenuation of the sound collection sensitivity of a directional beam pattern of the sound collection unit, with reference to the orientation of the sound collection unit.

Using the position and the direction (orientation) of the sound collection unit calculated in step S1, the above-described directional cone is rotated and translated, so that the directional cone in the global coordinate system is obtained. Subsequently, for the directional cone expressed in the global coordinate system, the geometry processing unit 13 calculates a section taken along the seat area plane associated with the global coordinate system, and assumes that the calculated section is the sound collection range. In the present exemplary embodiment, sound within the sound collection range is collected, and sound outside the sound collection range is suppressed. In other words, the geometry processing unit 13 assumes that a section, which is taken along the plane of the sound-collection target area, of the directional cone is the boundary of the sound collection range. Determining the sound collection range by using this section of the directional cone allows the boundary of the sound collection range to correspond to a direction in which an attenuation of the sound collection sensitivity of the directional beam pattern of the sound collection unit is equal to a predetermined value. A technique such as a known three-dimensional computer-aided design (3D CAD) is applicable to such processing for determining a section of a solid graphic form.

In addition, as illustrated in FIG. 7, the section, which is taken along the plane, of the cone is an ellipse D, a parabola E, or a hyperbola F, each called a conic section. For example, assume that sound of the seat area is collected from above as exemplified by each of the sound collection units $3_6$ to $3_9$ illustrated in FIG. 2. In this case, when an angle formed by the directivity direction A (the direction of the sound collection unit) and the seat area plane is relatively large, the section of the directional cone is an ellipse as exemplified by each of representations (range images) 326 to 329 of the sound collection range illustrated in FIG. 5.

When the angle formed by the directivity direction and the seat area plane is relatively small, the section of the directional cone is a hyperbola (or a parabola only when the generatrix of the directional cone and the seat area plane are parallel). This is exemplified by the representations 311 to 315 each representing the sound collection unit illustrated in FIG. 5. Accordingly, the geometry processing unit 13 determines a boundary of the sound collection range based on an angle formed by the plane in which the sound collection sensitivity of the directional beam pattern of the sound collection unit is equal to a predetermined value (a plane formed of the collection of the generatrices B of the directional cone) and the plane of the sound-collection target area.

However, when the section of the directional cone is a hyperbola or a parabola, the geometry processing unit 13 determines a part of the boundary of the sound collection range based on a collection of points at each of which a distance from the sound collection unit is equal to a predetermined value (e.g., 10 m, which is a distance at which the sound collection sensitivity attenuates by 20 dB with respect to a reference distance 1 m in a free space). This allows a point, at which an attenuation at a distance from the sound collection unit is equal to the predetermined value, to correspond to the boundary of the sound collection range.

FIG. 5 illustrates an example in which the sound collection range is displayed with a representation approximated to a sector. As a method for approximating the representation to the sector, a known method such as least-squared fitting can be used. In FIG. 5, representations 321 to 325 each representing the sound collection range correspond to the representations 311 to 315 each representing the sound collection unit. In the representations 321 to 325, an angle (a central angle) between radiuses of the sector approximately indicates the degree of openness of the hyperbola or the parabola that is the section of the directional cone. In addition, an arc of the sector indicates the boundary determined by the distance from the sound collection unit.

The boundary of the sound collection range is described above to be determined based on the directional cone in which the attenuation attributable to the directional beam pattern is equal to the predetermined value. The boundary of the sound collection range is described above to be also determined based on the collection of the points at each of which the attenuation attributable to the distance is equal to the predetermined value. However, the boundary of the sound collection range may be determined considering these two attenuations comprehensively. Specifically, first, the attenuation attributable to the directional beam pattern (a difference from the directivity direction) and the attenuation attributable to the distance may be summed to determine the total attenuation for each point in the sound-collection target area. The boundary of the sound collection range may then be determined based on a collection of points at each of which the total attenuation is equal to a predetermined value (e.g., 20 dB). When the sound collection unit is omnidirectional, the boundary of the sound collection range is a circle in which the sound collection sensitivity is equal to or higher than a predetermined value. This corresponds to, for example, a section taken by the plane of the sound-collection target area of a sphere having a radius of 10 m.

When the sound collection unit is configured as the microphone array, the signal analysis processing unit 12 acquires a filter coefficient corresponding to the directivity currently formed by the sound collection unit, from the filter coefficients of directivity formation held by the storage unit 11. The signal analysis processing unit 12 then calculates a beam pattern of directivity by multiplying the acquired filter coefficient by the transfer function between the sound source of each direction and each of the microphone elements of the microphone array. The transfer function is also held by the storage unit 11. As this transfer function, for example, an array manifold vector (AMV) can be used. When the directivity can be isotropically formed with the microphone array, a direction, in which an attenuation from the directivity direction of the beam pattern is equal to the predetermined value, forms a directional cone as with the directional microphone. Once the directional cone is formed, the sound collection range corresponding to each of the sound collection units $3_{30}$ and $3_{40}$ can be calculated as a section, which is taken by the seat area plane, of the directional cone expressed in the global coordinate system. This is performed in a manner similar to the case where the sound collection unit is configured as the directional microphone. In the present exemplary embodiment, the sound collection unit $3_{30}$ forms three sound collection ranges (corresponding to representations 331 to 333 illustrated in FIG. 5) based on three directivities, and the sound collection unit $3_{40}$ forms two sound collection ranges (corresponding to representations 341 and 342 illustrated in FIG. 5) based on two directivities.

The three-dimensional beam pattern and the directional cone may not be necessarily considered. For example, the sound collection range may be simply calculated by supposing the directivity direction of the directivity and the seat area plane, which is the sound-collection target area, are substantially on the same plane. To be more specific, in a two-dimensional beam pattern having only an azimuth angle, for example, an arc formed around the position of the sound collection unit and having a radius of 10 m may be the sound collection range. The radial direction of this arc is a direction in which an attenuation from the directivity direction is equal to the predetermined value.

The sound of the ground area 31 is assumed to be collected remotely, using the sound collection units $3_{51}$ and $3_{52}$ illustrated in FIG. 2 that are each configured as the microphone array of a large scale.

As for the sound collection of the seat areas 32 to 39 described above, the sound collection range is determined based on the directivity of the sound collection unit. In contrast, as for the sound collection of the ground area 31, assume that fifteen division areas (corresponding to representations $31_1$ to $31_{15}$ each representing the division area), which are tile-like areas into which the ground area 31 is divided as illustrated in FIG. 5, are determined beforehand as individual sound collection ranges. Further, in the present exemplary embodiment, assume that the directivity of each of the sound collection units $3_{51}$ and $3_{52}$ each implementing such a sound collection range is already determined, and the corresponding filter coefficient of directivity formation is used. In other words, the directivity direction and the sharpness of each of the directivities formed by the respective sound collection units $3_{51}$ and $3_{52}$ are optimized beforehand in such a manner that a section, which is taken along the ground area plane, of the three-dimensional directivity becomes as close as possible to the division areas (corresponding to the representations $31_1$ to $31_{15}$) that are predetermined sound collection ranges.

In step S6, the display processing unit 15 generates a representation, in which the representation of the sound collection range attributable to each of the directivities of the respective sound collection ranges calculated (generated) in step S5 is superimposed on the representations of the sound-collection target area and the sound collection units generated in step S4. To be more specific, as for the representations 32', 33', 36', 38', and 39' each representing the seat area, the display processing unit 15 superimposes images of the representations 321 to 329 each representing the sound collection range near the representations 311 to 319 representing the sound collection units $3_1$ to $3_9$, respectively, as illustrated in FIG. 5. In other words, the display processing unit 15 generates a display image in which an area image of the sound-collection target area and a range image of a shape expressing the sound collection range are superimposed on one another. Further, as for representations 34' and 38' each representing the seat area, the display processing unit 15 superimposes the representations 331 to 333, 341, and 342 each representing the sound collection range near the representations 330 and 340 representing the sound collection units $3_{30}$ and $3_{40}$, respectively. Displaying such an image clarifies a correspondence between the sound collection unit and the sound collection range, so that a user can easily recognize which sound collection unit is collecting sound for which sound collection range.

When the sound collection unit and the sound collection range are away from each other as in the sound collection of the ground area 31, the display processing unit 15 brings a line of a graphic form expressing the sound collection unit and at least one of a line color, a line type, and a line thickness of the boundary line of the sound collection range into a correspondence with each other. This can clarify for which range the sound is collected by each of the sound collection units. In other words, in FIG. 5, the representation 351, which represents the sound collection unit $3_{51}$ and which is demarcated with a solid line, indicates that sound collection is to be performed for eight division areas $31_1$ to $31_8$ each having the boundary line indicated with a solid line, among the fifteen sound collection ranges (division areas) of the representation 31' of the ground area. In addition, the representation 352, which represents the sound collection unit $3_{52}$ and which is demarcated with a dotted line, indicates that the sound collection is to be performed for the remaining seven division areas $31_9$ to $31_{15}$ each having the boundary line indicated with a dotted line. Displaying such an image clarifies a correspondence between the representations 351 and 352 representing the sound collection units $3_{51}$ and $3_{52}$, respectively, and the representations $31_1$ to $31_{15}$ each representing the sound collection range. Accordingly, a user can easily recognize which sound collection unit is collecting sound for which sound collection range.

In this way, the representation of the sound-collection target area is displayed, and the sound collection unit is displayed in such a manner that the position and the direction thereof are clear. Further, the sound collection range is displayed in such a manner that the correspondence with the sound collection unit is clear. The sound collection state attributable to the directivity of each of the sound collection units in the sound-collection target area can be thereby recognized easily.

In step S7, the signal analysis processing unit 12 calculates a level (a sound collection level) of sound being collected with the directivity in the current directivity loop, for the sound collection unit in the current sound collection unit loop. When the sound collection unit is configured as the directional microphone, the acoustic signal of sound being collected by the directional microphone directly becomes a directivity sound collection signal representing the sound of the sound collection range. On the other hand, when the sound collection unit is configured as the microphone array, a directivity sound collection signal is obtained by multiplying the acoustic signal of each of a plurality of channels of the sound being collected by each of the microphone elements of the microphone array by a filter coefficient corresponding to the directivity. The signal analysis processing unit 12 calculates a directivity sound collection level, which is the level of the directivity sound collection signal, as a mean-square value of the directivity sound collection signals in the current time block.

The directivity sound collection level calculated by this step S7 is useful for monitoring of the directivity sound collection signal itself to find out, for example, whether the directivity sound collection signal is clipped. On the other hand, the level representation of the directivity sound collection signal of the sound collection range of each of the sound collection units can be associated with spatial average power of sound sources present in the sound collection range. This is performed to recognize a sound collection state depending on each of the sound collection units easily in a wide sound-collection target area such as the stadium 5. In other words, it is desirable to obtain a representation such as a sound pressure map. For example, the level of the sound collection range corresponding to the seat area of a scoring team or the sound collection range in which a main play is taking place in the ground area may be increased according to the spatial average power of the sound sources in the sound collection range.

Assume that, as for each of the sound collection units, a default sound collection gain is determined in such a manner that, when sounds are collected based on the directivity for the point sound sources with identical reference distances, the directivity sound collection levels substantially become identical. However, when the directivity sound collection level is too small or too large depending on the state of the sound source in each of the sound collection ranges, an adjustment may be made from the default sound collection gain. In such a case, the correspondence between the directivity sound collection level and the power of the sound source may be lost.

Further, in particular, in the sound collection in an area exemplified by each of the seat areas 32 to 39 illustrated in FIG. 2, the size of the sound collection range may variously change depending on the sharpness of the directivity formed by the sound collection unit and the positional relationship with the seat area plane. For this reason, the directivity sound collection level is large when the sound collection unit is omnidirectional and the sound collection range is wide, whereas the directivity sound collection level is small when the sound collection unit is directional and the sound collection range is small, even if the degrees of excitement in audience are about the same.

In other words, the correspondence between the directivity sound collection level and the spatial average power of the sound sources in the sound collection range assumed to correspond to the excitement may be lost.

Furthermore, in particular, in the sound collection in an area such as the ground area 31 illustrated in FIG. 2, the distances between the sound collection units $3_{51}$ and $3_{52}$ each configured as the microphone array and the respective sound collection ranges (the division areas) of the ground area are different. For this reason, even if the same sound occurs in each of the division areas, the directivity sound collection level of the sound collection unit is smaller as the distance from the sound collection range is longer. Accordingly, the correspondence between the directivity sound collection level and the power of the sound source is lost.

For such reasons, in step S8 to step S10, the control apparatus 10 calculates the normalized sound collection level corresponding to the spatial average power of the sound sources in the sound collection range by normalizing the directivity sound collection level calculated in step S7.

In step S8, the following processing is performed. The sound collection control unit 17 acquires an adjustment amount (e.g., +A dB) from the default sound collection gain for the sound collection unit in the current sound collection unit loop. The signal analysis processing unit 12 then normalizes the directivity sound collection level calculated in step S7 to offset this adjustment amount (e.g., by a decrease of A [dB]). This makes it possible to calculate the normalized sound collection level that allows a correspondence with the power of the sound source, even if an adjustment from the default sound collection gain is made.

In step S9, the following processing is performed. The geometry processing unit 13 calculates the size (area) of the sound collection range determined in step S5. The signal analysis processing unit 12 then performs further normalization by dividing the normalized sound collection level calculated in step S8 by the calculated area. This makes it possible to calculate the normalized sound collection level that allows a correspondence with the spatial average power of the sound sources in the sound collection range, even if the sizes of the sound collection ranges vary.

In step S10, the following processing is performed. The geometry processing unit 13 calculates a distance between the sound collection unit and the sound collection range based on the position of the sound collection unit calculated in step S1, and the sound collection range determined in step S5. The position representing the sound collection range may be the center of the sound collection range, or may be the position closest to the sound collection unit at the boundary of the sound collection range. The signal analysis processing unit 12 then performs further normalization by multiplying the normalized sound collection level calculated in step S9 by the square of the calculated distance. The normalized sound collection level that allows a correspondence with the power of the sound source is thereby calculated, even if the distances each between the sound collection unit and the sound collection range vary. Such multiplication by the square of the distances is to offset a distance attenuation based on the inverse square law of free space. A number smaller than the square may be used for a space with reflection, because an attenuation in such a space is considered to be small.

In step S11, the display processing unit 15 generates a representation of the directivity sound collection level calculated in step S7 and a representation of the normalized sound collection level calculated in step S8 to step S10. The display processing unit 15 then superimposes the generated representations on the representation of each of the sound-collection target area, the sound collection unit, and the sound collection range generated in step S6, and displays these superimposed representations.

In other words, the display processing unit 15 changes a filling color of the representation of the sound collection range according to the normalized sound collection level. This is exemplified by the representations 321 to 329, 331 to 333, 341, and 342 of the sound collection ranges of the seat areas illustrated in FIG. 5, and the fifteen sound collection ranges (the division areas) of the ground area. In short, the representation of the sound collection range is filled with a different color according to the normalized sound collection level. That is, the range image of the shape expressing the sound collection range also indicates the loudness of this sound collection range at the same time. In FIG. 5, the difference between the filling colors is indicated in grayscale. In this way, the representation, such as a sound pressure map, indicating the normalized sound collection level of the sound collection range (the division area) in a wide sound collection area is generated. The spatial average power of the sound sources present in each of the sound collection ranges can be intuitively grasped and therefore easily recognized. In FIG. 5, the difference between colors is indicated in grayscale. However, a warm color such as red can be used for the sound collection range in which the normalized sound collection level is high. Further, a cold color such as blue can be used for the sound collection range in which the normalized sound collection level is low. Furthermore, a neutral color such as yellowish green can be used for the sound collection range in which the normalized sound collection level is intermediate. In FIG. 5, the normalized sound collection level is higher as the lightness of the sound collection range is higher to be closer to white, whereas the normalized sound collection level is lower as the lightness of the sound collection range is lower to be closer to black.

In this way, the sound collection range and the normalized sound collection level are displayed in an integrated manner. Then, the sound collection state of the sound-collection target area can be easily recognized by intuitively finding a place, for example, where an audience is excited in the seat area, or a place where a main play is taking place in the ground area.

In step S12, the display processing unit 15 causes the display unit 14 to display the representations generated in step S11, such as those illustrated in FIG. 5. By viewing the representations thus displayed, it is possible to recognize easily the sound collection state attributable to the directivity of the sound collection unit that collects the sound of the sound-collection target area.

Modifications

For example, a color bar, which indicates the correspondence between the filling color of the sound collection range and the normalized sound collection level (dB), may be displayed outside the sound-collection target area.

Further, the normalized sound collection level corresponding to the spatial average power of the sound sources in the sound collection range is not limitative. For example, the display processing unit 15 may display, in the sound collection range, the directivity sound collection level not normalized and used for monitoring the directivity sound collection signal itself. In this case, as with the representation of the normalized sound collection level described above, the filling color of the sound collection range may be changed according to the directivity sound collection level. Alternatively, the display processing unit 15 may change the filling range of the sound collection range according to the directivity sound collection level, as illustrated in FIG. 8A to 8C.

Figure 8A:
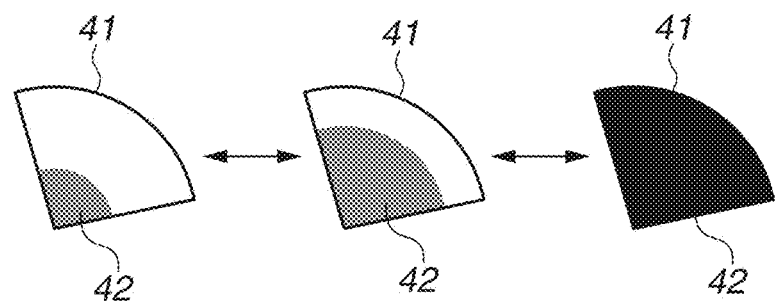
FIGS. 8A, 8B and 8C each illustrate an example of a representation of a sound collection level for a sound collection range.
Figure 8B:
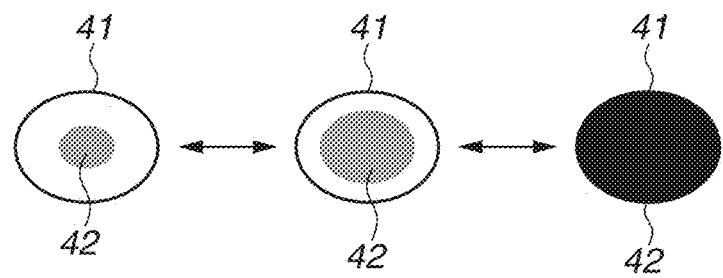
Figure 8C:
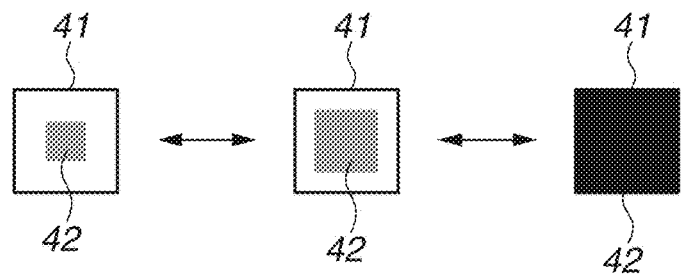

Specifically, as illustrated in FIGS. 8A to 8C, a filling range 42 of a sound collection range 41 is smaller as the directivity sound collection level is lower, and the filling range 42 of the sound collection range 41 is larger as the directivity sound collection level is higher. In addition, when the directivity sound collection level is particularly high and the directivity sound collection signal is clipped, the entire sound collection range 41 is the filling range 42. FIG. 8A illustrates an example of a representation when the sound collection range is a hyperbola (or parabola). FIG. 8B illustrates an example of a representation when the sound collection range is an ellipse. FIG. 8C illustrates an example of a representation when the sound collection range is a division area. Here, a starting point of filling may be the center of the sound collection range or may be the position closest to the sound collection range at the boundary of the sound collection unit. The representation such as the example illustrated in each of FIGS. 8A to 8C is, so to speak, a signal level meter having a shape of the sound collection range. This type of representation is distinctive as compared with an ordinary level meter displayed in the shape of a bar.

If the filling range of the sound collection range is brought into the correspondence with to the directivity sound collection level, the color of the filling range may be changed according to the directivity sound collection level, or may not be changed (e.g., filled with one color of yellowish green). However, if the directivity sound collection signal is clipped and the entire sound collection range is filled, the color of the filling range can be desirably changed to an eye-catching color (for example, to red expressing the clipping).

In this way, the sound collection range and the normalized sound collection level are displayed in an integrated manner. Accordingly, the sound collection state of the sound-collection target area can be easily recognized, and thus, the clipping of the directivity sound collection signal can be grasped and the sound collection gain can be effectively adjusted.

Assume that the representation of the sound collection unit and the representation of the sound collection range are away from each other, as in the sound collection of the ground area 31. In this case, as described above, the lines (the solid line and the dotted line) of the representations (graphic forms) 351 and 352 representing the sound collection units $3_{51}$ and $3_{52}$, respectively, are brought into the correspondence with the features such as the color, type, and thickness of the boundary line of each of the representations $31_1$ to $31_{15}$ each representing the sound collection range, in step S6. However, in step S6, the color of the line of the graphic form representing the sound collection unit may be brought into a correspondence with the color of the filling range of the sound collection range.

The filling range or the color of the filling range of the sound collection range may be changed according to the normalized sound collection level, in place of the directivity sound collection level.

Figure 9A:
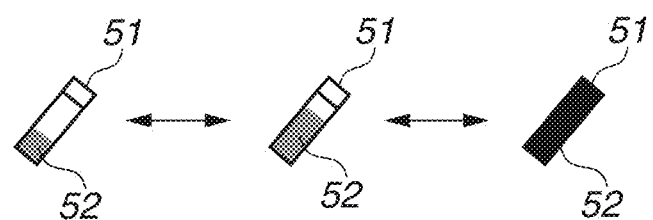
FIGS. 9A and 9B each illustrate an example of a representation of a sound collection level for a sound collection unit.
Figure 9B:
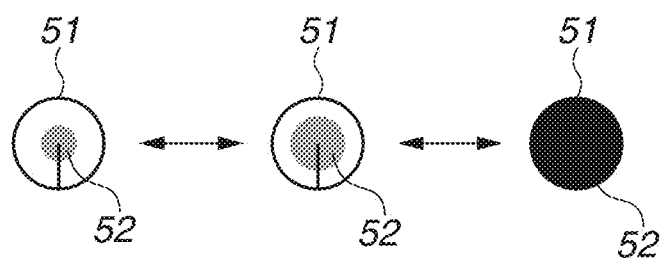

The normalized sound collection level and the directivity sound collection level are described above to be displayed by filling the representation of the sound collection range. However, these levels may be displayed by similarly filling the representation of the sound collection unit. In other words, the display processing unit 15 may change the filling color of the representation of the sound collection unit according to the normalized sound collection level or the directivity sound collection level. Alternatively, the display processing unit 15 may change a filling range 52 of a display 51 of the sound collection unit as illustrated in each of FIGS. 9A to 9B. FIG. 9A illustrates an example of a representation when the sound collection unit is configured as the directional microphone. FIG. 9B illustrates an example of a representation when the sound collection unit is configured as the microphone array. Here as well, if the directivity sound collection signal is clipped and the entire sound collection range is filled, the color of the filling range 52 can be desirably changed to an eye-catching color.

In a case where the sound collection unit configured as the microphone array covers a plurality of sound collection ranges, the maximum level, for example, may be displayed for the sound collection unit among a plurality of normalized sound collection levels or directivity sound collection levels.

When the sound collection unit is configured as the directional microphone, the directivity sound collection signal and the acoustic signal of the sound collected by the directional microphone are the same. However, when the sound collection unit is configured as the microphone array, the directivity sound collection signal and the acoustic signal of the sound collected by the directional microphone are different. So, the acoustic sound collection level, which is the level of the acoustic signal, may be calculated as, for example, the mean-square value of the acoustic signals in the current time block. Subsequently, among the acoustic sound collection levels of a plurality of channels, the maximum level, for example, may be displayed by filling the sound collection unit or the sound collection range.

The normalized sound collection level and the directivity sound collection level may be simultaneously displayed by filling the sound collection range and the sound collection unit. For example, the filling color of the sound collection range may be changed according to the normalized sound collection level, and the filling range of the sound collection unit may be changed according to the directivity sound collection level (or the acoustic sound collection level). The display processing unit 15 may change the display position (the sound collection range, or the sound collection unit) of the normalized sound collection level or the directivity sound collection level, or the display method (the filling color, or the filling range) of the sound collection, according to a user operation input detected by the operation detection unit 16.

The color having high color saturation and used for the filling of the sound collection range or the sound collection unit may be made conspicuous. To do so, a low-saturation color or an achromatic color may be used for the line of the graphic form representing the sound-collection target area or the sound collection unit, the boundary line of the sound collection range, or the background color of the representation.

Transparency (e.g., 0% to 100%) in the filling of the present exemplary embodiment is arbitrary.

The adjustment amount (or the sound collection gain itself) from the default sound collection gain acquired in step S8 may be brought into a correspondence with the representation of the sound collection range (or the sound collection unit), and displayed in, for example, a numerical value (e.g., +5). This is exemplified by the representation 325 of the sound collection range illustrated in FIG. 5.

The various kinds of data held by the storage unit 11 in the exemplary embodiment may be input via a data input/output unit (not illustrated) from outside.

In the exemplary embodiment, the two-dimensional representation when the sound-collection target area is viewed from right above is generated as illustrated in FIG. 5. However, a three-dimensional representation when the sound-collection target area is viewed from another direction may be generated.

When the sound-collection target area is, for example, a soccer stadium, various lines and goals of a soccer field may be schematically displayed in the ground area. In addition, projective transformation may be performed on a video signal generated by the imaging unit whose position and orientation are known, so that an image may be displayed (e.g., in monochrome) on the plane of the ground area or the plane of the seat area. At the time, video recognition may be applied to the video signal, and the display processing unit 15 may display only a main object such as a player and a ball. Such display makes it possible to recognize the sound collection state of the sound-collection target area easily, while confirming the correspondence with a game status.

For example, in FIG. 5, a ball 360 is displayed, and the sound-collection target area (the division area $31_7$) near the ball 360 where a main play is considered to be taking place is displayed in a color relatively lighter than those of the surrounding division areas. Such display allows a user to recognize easily the normalized sound collection level of the division area $31_7$ being high.

When the sound collection unit includes a remotely controllable pan head, the following configuration is possible. The sound collection control unit 17 may control the position and the orientation of the sound collection unit by controlling the pan head according to a user operation input detected by the operation detection unit 16. When the sound collection unit is configured as the microphone array, the following configuration is possible. The signal analysis processing unit 12 may control the directivity direction or sharpness of the directivity formed by the sound collection unit, by changing the filter coefficient of the directivity formation by which the acoustic signal is to be multiplied, according to a user operation input detected by the operation detection unit 16. In these cases, the position and the orientation of the sound collection unit as well as the sound collection range of the directivity can also change for each of the time blocks, according to, for example, the user operation input detected for each of the time blocks. Accordingly, the processes in step S4 to step S6 are also performed for each of the time blocks. Assume that, at the time, for example, the size of the sound collection range changes due to a change made to the sharpness of the directivity. Even in this case, the filling color according to the normalized sound collection level is expected to be substantially maintained because of the normalization based on the area of the sound collection range in step S9, if the degrees of excitement in audience are about the same.

According to the exemplary embodiment, the sound collection state attributable to the directivity of the sound collection unit that collects the sound of the sound-collection target area can be easily recognized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-130420, filed Jun. 30, 2016, which is hereby incorporated by reference herein in its entirety.

What is claimed is:

1. A display control apparatus comprising:
one or more hardware processors; and
one or more memories which store instructions executable by the one or more hardware processors to cause the display control apparatus to perform at least:
acquiring information about directivity of a microphone that collects sound from a sound-collection target area; and
controlling to cause a display unit to display a superimposed image in which an area image and a range image are superimposed on one another, the area image representing the sound-collection target area, and the range image having a shape representing a sound collection range according to the directivity of the microphone identified by the acquired information and the range image representing loudness of sound in the sound collection range.

2. The display control apparatus according to claim 1, wherein the controlling includes causing the display to display the superimposed image in which the area image, the range image, and a sound collection unit image representing a position of the microphone are superimposed on one another.

3. The display control apparatus according to claim 2, wherein the controlling includes determining a color of the sound collection image based on the loudness of sound in the sound collection range.

4. The display control apparatus according to claim 2, wherein the controlling includes determining a size of a part to be colored in the sound collection unit image based on the loudness of sound in the sound collection range.

5. The display control apparatus according to claim 2, wherein the sound collection unit image indicates both the position of the microphone and the orientation of the microphone.

6. The display control apparatus according to claim 1, wherein the controlling includes determining the shape of the range image based on a directional beam pattern of the sound collection, with reference to an orientation of the microphone.

7. The display control apparatus according to claim 1, wherein the controlling includes determining the shape of the range image based on an angle formed by a direction of a directional beam pattern of the microphone and a plane of the sound-collection target area.

8. The display control apparatus according to claim 1, wherein the controlling includes determining the shape of the range image based on an attenuation of sound collection sensitivity according to a distance from the microphone.

9. The display control apparatus according to claim 1, wherein the loudness of sound in the sound collection range is loudness of sound obtained by normalizing loudness of sound collected by the microphone by using a predetermined gain adjustment amount.

10. The display control apparatus according to claim 1, wherein the loudness of sound in the sound collection range is loudness of sound obtained by normalizing loudness of sound collected by the microphone by using an area of the sound collection range.

11. The display control apparatus according to claim 1, wherein the loudness of sound in the sound collection range is loudness of sound obtained by normalizing loudness of sound collected by the microphone by using a distance between the sound collection unit and the microphone.

12. The display control apparatus according to claim 1, wherein the controlling includes determining a color of the range image based on the loudness of sound in the sound collection range.

13. The display control apparatus according to claim 1, wherein the controlling includes determining a size of a part to be colored in the range image based on the loudness of sound in the sound collection range.

14. The display control apparatus according to claim 1, wherein the acquiring includes acquiring information about directivity of each of a plurality of microphones that collect sound from the sound-collection target area, and
wherein the controlling includes causing the display to display the superimposed image in which the area image and a plurality of range images corresponding to the plurality of microphone are superimposed on one another.

15. The display control apparatus according to claim 14, wherein the controlling includes causing the display to display the superimposed image in which the area image, the plurality of range images, and a plurality of sound collection images representing positions of the plurality of microphones are superimposed on one another.

16. The display control apparatus according to claim 15, wherein the controlling includes bringing a first range image corresponding to a first microphone, and a first sound collection image corresponding to the first microphone into correspondence with each other, in terms of at least one of a color, a line type, and a thickness of a line forming each of the range image and the sound collection image.

17. A display control method comprising:
acquiring information about directivity of a sound collection unit that collects sound from a sound-collection target area; and
performing control for causing a display unit to display a superimposed image in which an area image and a range image are superimposed on one another, the area image representing the sound-collection target area, and the range image having a shape representing a sound collection range according to the directivity of the sound collection unit identified by the acquired information and representing loudness of sound in the sound collection range.

18. The display control method according to 17, wherein the controlling causes the display unit to display the superimposed image in which the area image, the range image, and a sound collection unit image representing a position of the sound collection unit are superimposed on one another.

19. The display control method according to 17, wherein the loudness of sound in the sound collection range is loudness of sound obtained by normalizing loudness of sound collected by the sound collection unit by using a predetermined gain adjustment amount.

20. A non-transitory computer readable storage medium storing a program for causing a computer to execute a display control method, the display control method comprising:
acquiring information about directivity of a sound collection unit that collects sound from a sound-collection target area; and
performing control for causing a display unit to display a superimposed image in which an area image and a range image are superimposed on one another, the area image representing the sound-collection target area, and the range image having a shape representing a sound collection range according to the directivity of the sound collection unit identified by the acquired information and representing loudness of sound in the sound collection range.

* * * * *